US010323693B2

(12) United States Patent
Beesley et al.

(10) Patent No.: US 10,323,693 B2
(45) Date of Patent: Jun. 18, 2019

(54) DISCONNECT SYSTEM FOR AN AXLE

(71) Applicant: Dana Automotive Systems Group, LLC, Maumee, OH (US)

(72) Inventors: Peter A. Beesley, Fort Wayne, IN (US); Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 48 days.

(21) Appl. No.: 15/376,725

(22) Filed: Dec. 13, 2016

(65) Prior Publication Data

US 2017/0167544 A1 Jun. 15, 2017

Related U.S. Application Data

(60) Provisional application No. 62/266,946, filed on Dec. 14, 2015.

(51) Int. Cl.
*F16D 11/14* (2006.01)
*B60K 17/02* (2006.01)
(Continued)

(52) U.S. Cl.
CPC ............. *F16D 11/14* (2013.01); *B60K 17/02* (2013.01); *F16D 23/12* (2013.01); *F16D 28/00* (2013.01);
(Continued)

(58) Field of Classification Search
CPC .......... F16D 11/14; F16D 23/12; F16D 23/14; F16D 2023/123; F16D 28/00;
(Continued)

(56) References Cited

U.S. PATENT DOCUMENTS 3,669,476 A    6/1972 Wilson
3,776,066 A *  12/1973 Piret ................... F16H 3/663
                                                475/146
(Continued)

FOREIGN PATENT DOCUMENTS

DE        4230326 A1    3/1993
DE    102016113643 A1   2/2017

OTHER PUBLICATIONS

German Patent Office Action for German Application No. DE 10 2016 224 864.2, dated Nov. 17, 2017.

*Primary Examiner* — Jacob S. Scott
*Assistant Examiner* — Lori Wu
(74) *Attorney, Agent, or Firm* — Marshall & Melhorn, LLC

(57) ABSTRACT

An axle disconnect system for drive axles that utilizes an engagement spring, an electric motor and a slidable gear. The motor is connected to the slidable gear which moves along threads thereby engaging or disengaging clutch teeth on a first side gear which selectively engages a second side gear. The engagement spring is located between a bearing and the first side gear wherein when engagement is desired, but blocked by misalignment of the teeth, the engagement spring can apply a load to allow for engagement once alignment of the teeth is achieved. The use of a second engagement spring allows for the disengagement of the system when disengagement is typically blocked due to high driveline torques without having to reapply current to the motor.

13 Claims, 4 Drawing Sheets

(51) Int. Cl.
  *F16D 28/00* (2006.01)
  *F16H 25/20* (2006.01)
  *F16D 23/12* (2006.01)
  *B60K 17/34* (2006.01)
  *F16D 11/00* (2006.01)
  *B60K 23/08* (2006.01)
  *B60K 5/02* (2006.01)
  *B60K 17/344* (2006.01)

(52) U.S. Cl.
  CPC ............. *F16H 25/20* (2013.01); *B60K 5/02* (2013.01); *B60K 17/34* (2013.01); *B60K 17/344* (2013.01); *B60K 2023/0825* (2013.01); *B60Y 2400/405* (2013.01); *B60Y 2400/421* (2013.01); *F16D 2011/002* (2013.01); *F16D 2023/123* (2013.01); *F16H 2025/2081* (2013.01)

(58) Field of Classification Search
  CPC . F16H 25/20; F16H 2025/2081; B60K 17/02; B60K 17/34; B60K 17/3462
  See application file for complete search history.

(56) References Cited

U.S. PATENT DOCUMENTS

| | | |
|---|---|---|
| 4,281,749 A | 8/1981 | Fogelberg |
| 4,595,087 A | 6/1986 | Morisawa et al. |
| 4,770,280 A | 9/1988 | Frost |
| 4,776,441 A | 10/1988 | Kagata et al. |
| 4,895,236 A | 1/1990 | Sakakibara et al. |
| 4,928,804 A | 5/1990 | Wakabayashi |
| 4,976,347 A | 12/1990 | Sakakibara et al. |
| 6,520,885 B2 | 2/2003 | Gassmann et al. |
| 6,698,565 B2 | 3/2004 | Cool et al. |
| 7,156,771 B2 | 1/2007 | Teraoka |
| 8,382,633 B2 | 2/2013 | Cooper et al. |
| 8,720,633 B2 | 5/2014 | Grutter et al. |
| 9,016,150 B2 | 4/2015 | Perakes et al. |
| 2003/0184171 A1* | 10/2003 | Teraoka ............... F16H 48/24 310/80 |
| 2010/0044138 A1* | 2/2010 | Marsh ............... B60K 17/348 180/247 |
| 2015/0343901 A1* | 12/2015 | Brooks ............ B60K 17/3462 180/245 |

* cited by examiner

DISCONNECT SYSTEM FOR AN AXLE

RELATED APPLICATIONS

The present application claims priority to and the benefit from Provisional U.S. Patent Application Ser. No. 62/266,946 filed on Dec. 14, 2015. The content of the above-noted patent application is hereby expressly incorporated by reference into the detailed description of the present application.

FIELD

The present disclosure relates to a system for connecting and disconnecting axles within a vehicle and, more particularly, to an axle disconnect system for an auxiliary drive axle system of a four-wheel drive motor vehicle.

BACKGROUND

Four-wheel drive (or all-wheel) vehicles which are operable in either a two-wheel drive mode or four-wheel drive mode are well-known in the prior art. Typically, four-wheel drive capable vehicles include a transfer case, a rear drive shaft, a front drive shaft and an axle disconnect system. The transfer case is configured to divide power between the rear and front drive shafts when the four-wheel drive mode is engaged.

Axle disconnect systems for front and rear axle assemblies are well-known and various assemblies or mechanisms have been proposed. These disconnect systems allow for increased fuel economy by selectively disconnecting driveline rotating parts when four-wheel drive is not engaged. Although suitable disconnect mechanisms have been developed, there is a need for systems that allow for rapid and frequent engagements and disengagements under high driveline drag conditions without increasing the mass, weight and packaging for the systems and, thus, the cost of the system.

SUMMARY

The present disclosure provides for an improved axle disconnect system which allows for engagement and disengagement under high driveline drag conditions.

In one aspect, the axle disconnect system for drive axles of a motor vehicle includes an engagement spring having two axial ends, a power source, a stationary axle housing having a threaded portion on a radially inner surface thereof, a slidable gear drivingly connected to the power source having a radially inner surface and a radially outer surface with a set of threads thereon, a first side gear drivingly connected to a first axle half shaft and the slidable gear having two axial ends and a radially outer surface, a second side gear having teeth on one end thereof and drivingly connected to a second axle half shaft, and a bearing positioned between the radially outer surface of the first side gear and the radially inner surface of the slidable gear. The threads of the stationary axle mate with the threads on the slidable gear. The first side gear has teeth one end thereof that selectively engage with the teeth of the second side gear. The engagement spring is positioned on the radially outer surface of the first side gear having one axial end surface connected to the bearing and the other axial end surface connected to the first side gear. The slidable gear slides along the threads to preload the engagement spring when the teeth of the first and second side gears are not in alignment.

BRIEF DESCRIPTION OF THE DRAWINGS

The above, as well as other advantages of the present embodiments, will become readily apparent to those skilled in the art from the following detailed description when considered in the light of the accompanying drawings in which.

DETAILED DESCRIPTION OF THE PREFERRED EMBODIMENTS

Figure 1:
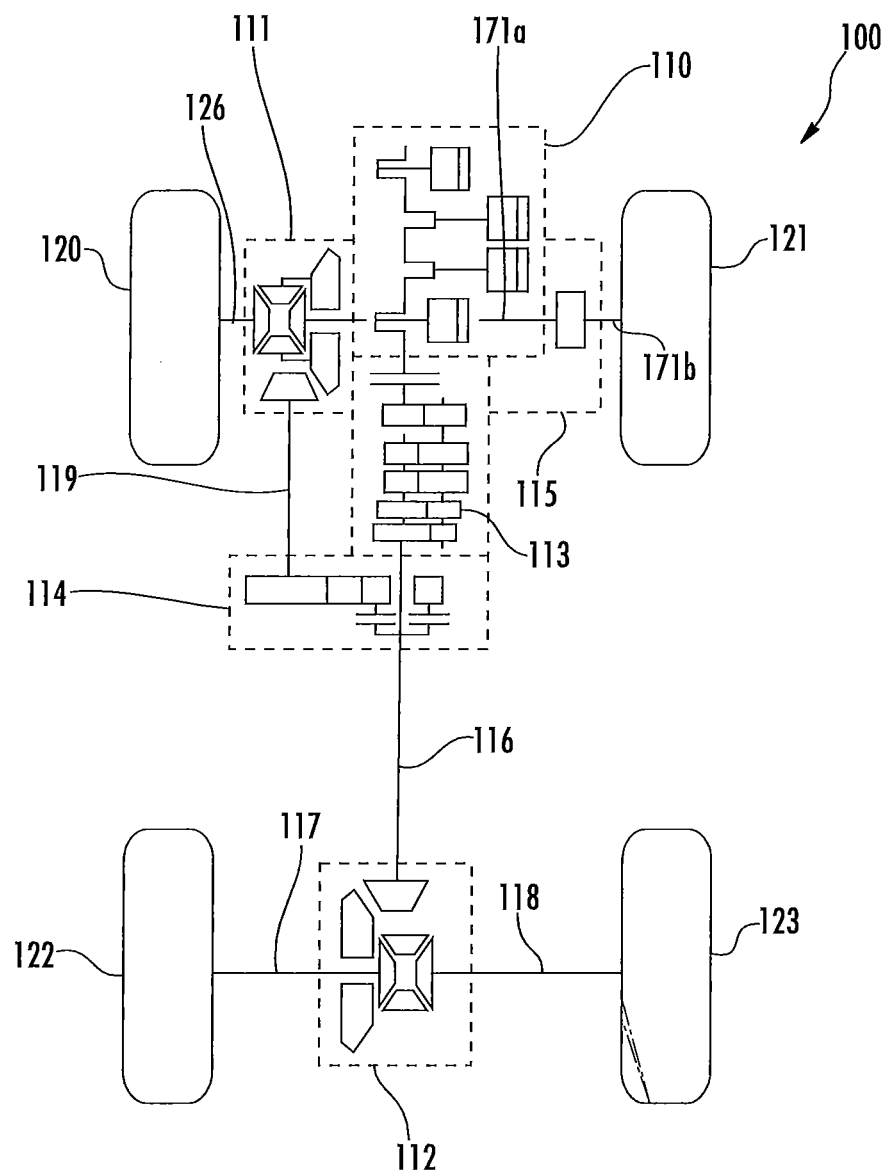
FIG. 1 is a schematic view of vehicle drivetrain as including a preferred embodiment of the axle disconnect system.

It is to be understood that the embodiments may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined in herein. Hence, specific dimensions, directions or other physical characteristics relating to the embodiments disclosed are not to be considered as limiting, unless expressly stated otherwise. In addition, although they may not be, like elements in various embodiments may be commonly referred to with like reference numerals within this section of the application.

Referring now to the drawings and more particularly to FIG. 1, there is shown a schematic diagram of a four-wheel or all-wheel drive drivetrain of a motor vehicle 100 including an axle disconnect system 115. The schematic shows a primarily rear wheel driven vehicle; however, the axle disconnect system 115 can also be used on a primarily front wheel driven vehicle or other driveline assemblies and arrangements.

As shown in FIG. 1, in one embodiment, the vehicle 100 includes a power source 110, a transmission 113 and a transfer case 114 mounted on a vehicle chassis (not shown). The power source 110 includes, but is not limited to, an internal combustion engine and is drivingly coupled to the transmission 113. The transfer case 114 is mounted behind the transmission 113. The transfer case 114 is drivingly connected to a front differential assembly 111 by a front drive shaft 119 and to a rear differential assembly 112 by a rear drive shaft 116. The engine 110 and transmission 113 are conventional and well-known components.

Inside the transfer case 114, drive torque originating from the transmission 113 is divided between the rear 116 and front 119 drive shafts. In one case, referred to as "all-wheel drive," drive torque is provided to both drive shafts 119, 116. In another case, referred to as "two-wheel drive," drive torque is provided only to one drive shaft, 119 or 116. Each of the drive shafts 119, 116 used with the transfer case 114 are rotatably supported within the transfer case 114 by appropriate support means, such as ball bearing assemblies or the like and the openings through which the drive shafts 119, 116 enter or exit the transfer case 114 are provided with appropriate seal assemblies The transfer case 114 typically includes an input shaft, a main output shaft and an auxiliary output shaft. The main output shaft is drive connected to the input shaft by a clutch or the like in the transfer case 114 and customarily offset from the transfer case. The clutch is actuated by a suitable selector mechanism controlled by the vehicle operator. The internal details of the transfer case 114 and details of a selector are not shown because these are conventional and well-known components.

The front differential assembly 111 includes a differential gear arrangement. The differential gear arrangement can include a pinion gear, a ring gear and differential side gears; however, other differential gear arrangements are possible. A first front wheel 120 is connected to the front differential assembly 111 by a front drive axle 126. The axle disconnect system 115 is drivingly connected to the front differential assembly 111 by a first front drive half axle 171a. A second front wheel 121 is connected to the disconnect system 115 by a second front drive half axle 171b.

The rear differential assembly 112 is connected to the transfer case 114 by the rear drive shaft 116. The rear differential assembly 112 includes a differential gear arrangement. The differential gear arrangement can include a pinion gear, a ring gear and differential side gears; however, other differential gear arrangements are possible.

Primary rear wheels 122, 123 are drivingly connected to the rear differential assembly 112 by rear shafts 117, 118 respectively. The secondary wheels 120, 121 are undriven wheels except that they are connected to the power source 110 when in "all-wheel drive" is operating. The secondary wheels 120, 121 are selectively driven when the disconnect system 115 connects the first front half axle 171a and the second front drive half axle 171b.

As shown in FIG. 1, the disconnect system 115 is integrated with the front drive assembly, but can be a separate assembly.

Figure 2:
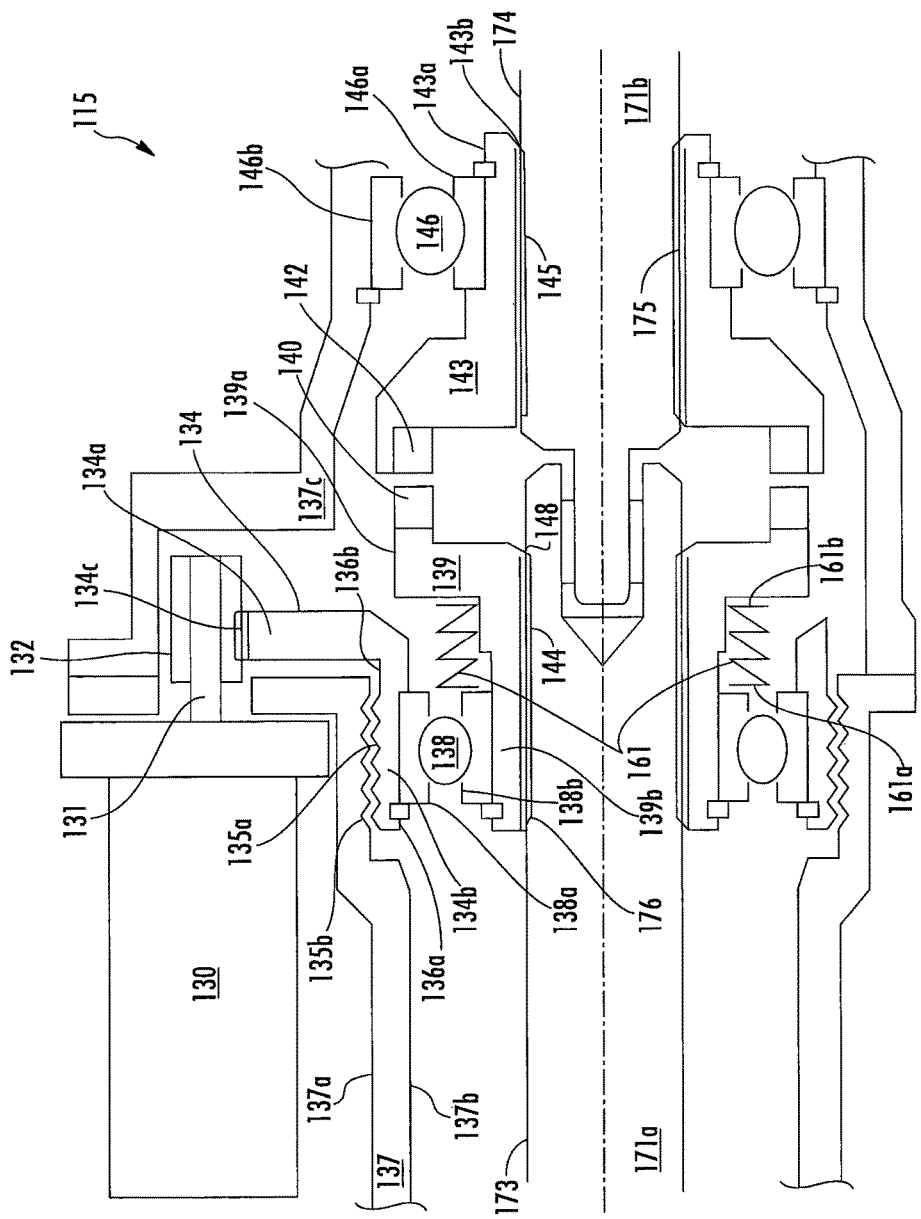
FIG. 2 is a partial section of a preferred embodiment of the axle disconnect system.

FIG. 2 illustrates a detailed section view of one preferred embodiment of the axle disconnect system 115 including a power source 130 with an output shaft 131 drivingly connected to a drive gear 132. The power source 130 may be a high speed-low torque power source including, but not limited to, a brushed direct current electric motor.

The drive gear 132 has teeth formed on one end thereof that mesh with teeth 134c formed on the end of a slidable gear 134. By selecting the outer diameter of the gears 132, 134, and/or the number of teeth on each gear 132, 134, the drive ratio of the gear set can be selected. In addition, additional gears (not depicted) may be operatively connected between the power source 130 and gear 134 to obtain a desired speed reduction ratio or enable specific position of the power source 130. In one embodiment the drive gear ratio between the drive gear 132 and the slidable gear 134 is greater than 1.

The slidable gear 134 has a radially extending portion 134a and an axially extending portion 134b. The radially extending portion 134a has a set of teeth 134c on the radially outer end thereof that meshes with the teeth on the drive gear 132.

The axially extending portion 134b has a radially inner surface 136a and a radially outer surface 136b. The surfaces 136a, 136b are parallel to one another. The radially outer surface 136b includes a plurality of threads 135a formed thereon.

A stationary axle housing 137 has a radially inner surface 137b and a radially outer surface 137a. The radially inner surface 137b has threads 135b formed thereon that mesh with threads 135a of the slidable gear 134. The stationary axle housing 137 can be of one-piece or multi-piece construction. The power source 130 is positioned outside the stationary axle housing 137 with the output shaft 131 extending therethrough to connect with the drive gear 132.

A bearing 138 including an outer 138a and inner 138b raceway is coupled to the axially extending portion 134b of the slidable gear 134 on the outer raceway 138a and coupled to a first side gear 139 on the inner raceway 138b.

The first side gear 139 is positioned radially inward from the slidable gear 134. The first side gear 139 has an axially extending portion 139b and a radially extending portion 139a. The axially extending portion 139b has longitudinally extending splines 144 formed on a radially inner surface 148 thereof that mate with a set of splines 176 formed on an outer surface 173 of the first front drive half axle shaft 171a. The radially extending portion 139a has clutch teeth 140 formed on one end thereof in the axial direction. The clutch teeth 140 mesh with clutch teeth 142 formed on an end of a second side gear 143.

An engagement spring 161 is positioned between bearing inner raceway 138b and the radially extending portion 139a of the first side gear 139 in the axial direction. The engagement spring 161 can be, but is not limited to, a compression coil spring. The engagement spring 161 can have two axial ends 161a, 161b. One axial end 161a is in connected to an outer surface of the inner raceway 138b and the other axial end 161b is connected to an outer surface the radially extending portion 139a.

The second side gear 143 has a radial outer surface 143a and inner surface 143b with a set of longitudinally extending splines 145 formed on the inner surface 143b. Splines 145 mesh with a set of splines 175 formed on an outer surface 174 of the second front drive half axle shaft 171b. As depicted in FIG. 2, the splines 145 are formed on an axially extending portion of the second side gear 143. The axially extending outer surface 143a of second side gear 143 is connected to an inner raceway 146a of a bearing 146. Bearing 146 has an outer raceway 146b coupled to a stationary axle housing 137c.

The stationary axle housing 137, 137a, 137b, 137c houses slidable gear 134, the first side gear 139 and second side gear 143. The shape of the stationary axle housing 137, 137a, 137b, 137c can vary as the shape of the gears 134, 139, 143 vary allowing the disconnect system 115 to have a small footprint.

Figure 3A:
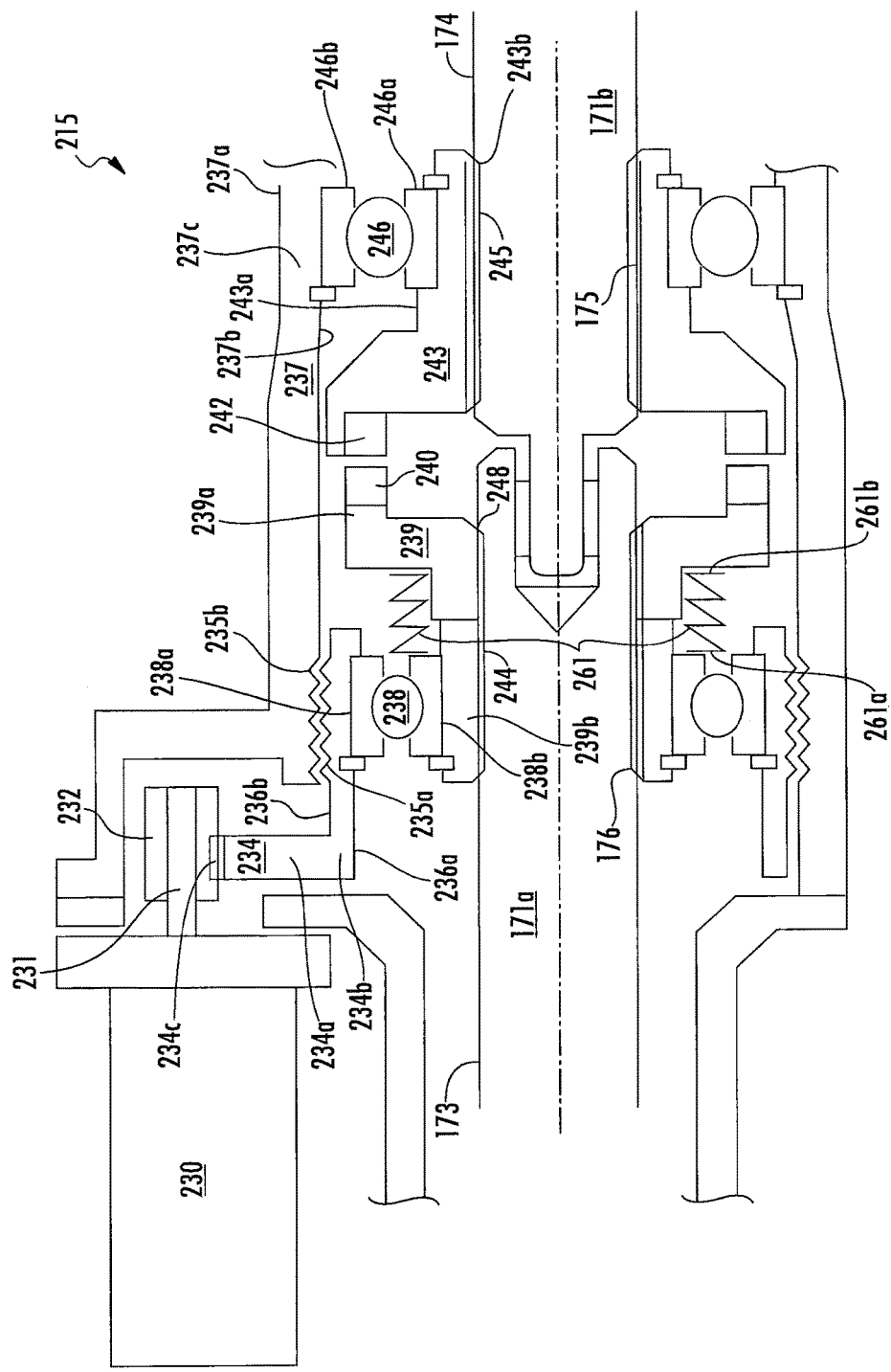
FIG. 3A is a partial section of another preferred embodiment of the axle disconnect system.

FIG. 3A depicts another preferred embodiment of an axle disconnect system 215 including a power source 230 with an output shaft 231 drivingly connected to a drive gear 232. The power source 230 may be a high speed-low torque power source including, but not limited to, a brushed direct current electric motor.

The drive gear 232 has teeth formed on one end thereof that mesh with teeth 234c formed on the end of a slidable gear 234. By selecting the outer diameter of the gears 232, 234, and/or the number of teeth on each gear 232, 234, the drive ratio of the gear set can be selected. In addition, additional gears (not depicted) may be operatively connected between the power source 230 and gear 234 to obtain a desired speed reduction ratio/ or enable specific position of the power source 230.

The slidable gear 234 has a radially extending portion 234a and an axially extending portion 234b. The radially extending portion 234a has a set of teeth 234c on the radially outer end thereof that meshes with the teeth 232c on the drive gear 232.

The axially extending portion 234b has a radially inner surface 236a and a radially outer surface 236b. The surfaces 236a, 236b are parallel to one another. The radially outer surface 236b includes a plurality of threads 235a formed thereon.

A stationary axle housing 237 has a radially inner surface 237b and a radially outer surface 237a. The radially inner surface 237b has threads 235b formed thereon that mesh with threads 235a of the slidable gear 234. The stationary axle housing 237 can be of one-piece or multi-piece construction. The power source 230 is positioned axially and radially outside the stationary axle housing 237 with the output shaft 231 extending therethrough to connect with the drive gear 232. As depicted in FIG. 3A, threads 235a can be positioned on any portion of the outer radially inner surface 237b of the stationary axle housing 237 parallel to an axially extending portion of a first side gear 239.

A bearing 238 including an outer 238a and inner 238b raceway is coupled to the axially extending portion 234b of the slidable gear 234 on the outer raceway 238a and coupled to the first side gear 239 on the inner raceway 238b.

The first side gear 239 is positioned radially inward from the slidable gear 234. The first side gear 239 includes the axially extending portion 239b and a radially extending portion 239a. The axially extending portion 239b has longitudinally extending splines 244 formed on a radially inner surface 248 thereof that mate with a set of splines 176 formed on an outer surface 173 of the first front drive half axle shaft 171a. The radially extending portion 239a has clutch teeth 240 formed on one end thereof in the axial direction. The clutch teeth 240 mesh with clutch teeth 242 formed on an end of a second side gear 243.

An engagement spring 261 is positioned between bearing inner raceway 238b and the radially extending portion 239a in the axial direction. The engagement spring 261 can be, but is not limited to, a compression coil spring. The engagement spring 261 can have two axial ends 261a, 261b. One axial end 261a is connected to an outer surface of the inner raceway 238b and the other axial end 261b is connected to an outer surface of the radially extending portion 239a.

The second side gear 243 has a radial outer surface 243a and inner surface 243b with a set of longitudinally extending splines 245 formed on the inner surface 243b. Splines 245 mesh with a set of splines 175 formed on an outer surface 174 of the second front drive half axle shaft 171b. As depicted in FIG. 3A, the splines 245 are formed on an axially extending portion of the second side gear 243. The axially extending outer surface 243a of second side gear 243 is connected to an inner raceway 246a of a bearing 146. Bearing 246 has an outer raceway 246b coupled to a stationary axle housing 237c.

The stationary axle housing 237, 237a, 237b, 237c houses the slidable gear 234, the first side gear 239 and second side gear 243. The shape of the stationary axle housing 237, 237a, 237b, 237c can vary as the shape of the gears 234, 239, 243 vary allowing the disconnect system 215 to have a small footprint.

The motor 130, 230 when energized by a current or other means, rotates gears 132, 134, 232, 234 and slidable gear 134, 234 moves axially forward and backwards along stationary axle housing 137, 237 via the threads 135a, 135b, 235a, 235b driving side gear 139, 239 toward and away from the second side gear 143, 243.

When the first side gear 139, 239 is moved axially toward the second side gear 143, 243 the clutch teeth 140, 142, 240, 242 can align and engage and the second side gear 143, 243 drives the second front drive half axle shaft 171b through splines 145, 245, 175 connecting the first front drive half axle shaft 171a and the second front drive half axle shaft 171b.

In some cases, when the first side gear 139, 239 is moved axially toward the second side gear 143, 243, the teeth 140, 142, 240, 242 will be misaligned, or blocked. When this occurs the slidable gear 134, 234 continues to exert a force on the first side gear 139, 239 and the engagement spring 161, 261 is compressed and preloaded. When the teeth 140, 142, 240, 242 are properly aligned, the engagement spring 161, 261 urges the teeth 140, 142, 240, 242 into meshed engagement by releasing its an axial load on the teeth 140, 142, 240, 242 without requiring the motor 130, 230 to apply additional force.

Figure 3B:
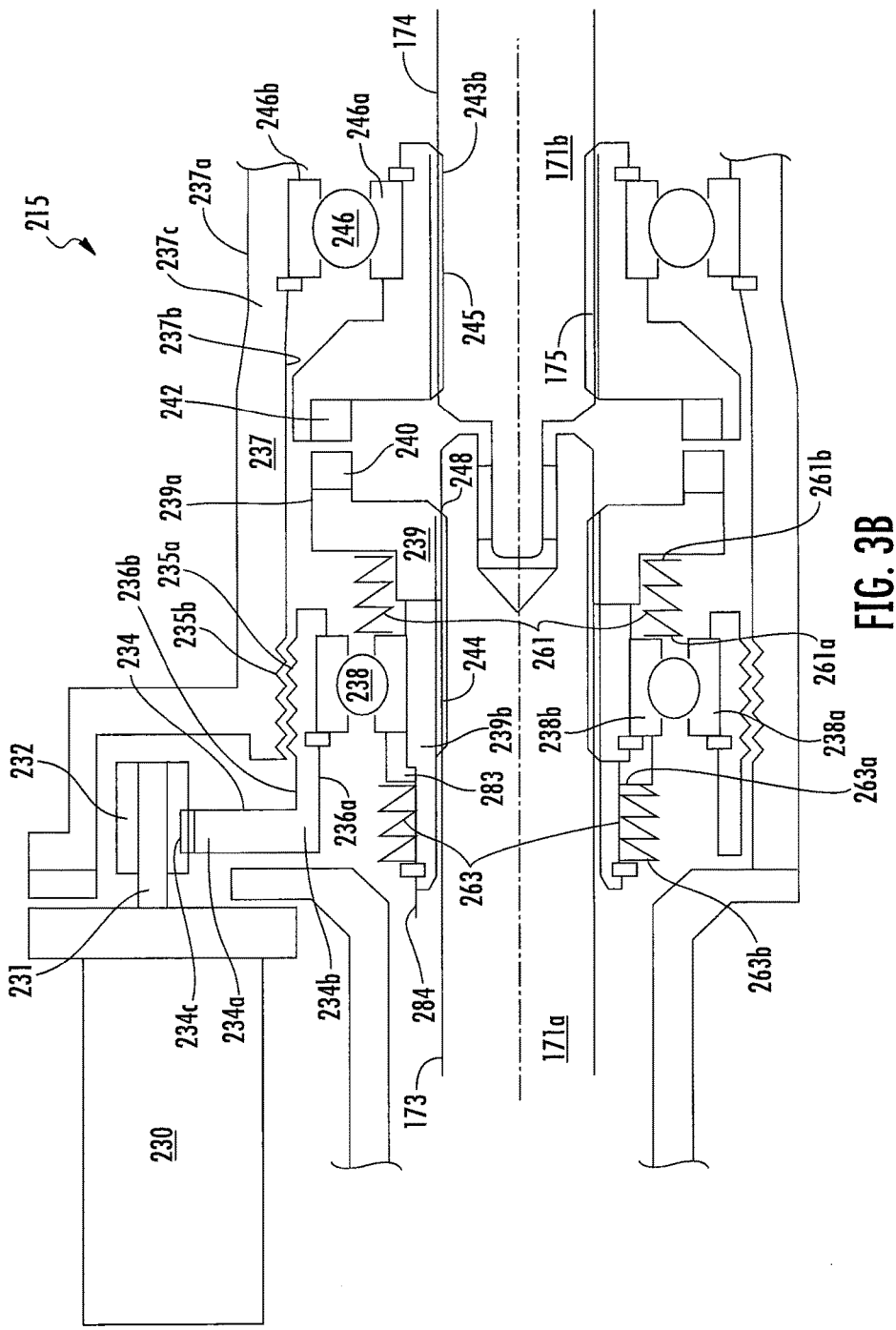
FIG. 3B is a partial section of an additional preferred embodiment of the axle disconnect system showing the use of an additional engagement spring.

In another embodiment, as shown in FIG. 3B, the axle disconnect system 215 can include a second engagement spring 263. The second engagement spring 263 can be, but is not limited to, a compression coil spring. The second engagement spring 263 is positioned on the opposite side of bearing 238 than that of engagement spring 261 in the axial direction. The second engagement spring 263 can have two axial ends 263a, 263b. One axial end 263a is connected to an outer surface of the inner raceway 238b and the other axial end 263b is connected to the end of the axially extending portion 239b of side gear 239.

In between the bearing 238 and the second engagement spring 263 is a shoulder spacer 283. In between the second engagement spring 263 and the axially extending portion 239b of side gear 239 is a retaining ring 284. The retaining ring 284 can be a snap ring. When the axle disconnect system 215 is engaged and disengagement is desired, the second engagement spring 263 allows disengagement by allowing the slidable gear 234 to move along the threads 235 despite a driveline torque that without the second engagement spring 263 may be too high to pull the clutch teeth 240, 242 out of engagement. The use of the second engagement spring allows for the disengagement of the system 215 when disengagement of the clutch teeth 240, 242 is typically blocked due to high driveline torques without having to reenergize the power source 230.

The shoulder spacer 283 prevents the second engagement spring 263 from loading the first engagement spring 261 when moving from a disengaged to an engaged position. The second engagement spring 263 should have a lower spring constant than the first engagement spring 261 to prevent the second engagement spring 263 to prevent the second engagement spring 263 from applying a biasing force greater than the biasing force of the first engagement spring 261.

In accordance with the provisions of the patent statutes, the present disclosure has been described in what is considered to represent its preferred embodiments. However, it should be noted that the invention can be practiced otherwise than as specifically illustrated and described without departing from its spirit or scope.

What is claimed is:

1. An axle connect/disconnect system for drive axles of a motor vehicle, comprising:
   a first engagement spring having two axial ends;
   a power source;
   a stationary axle housing having a plurality of threads formed on a radially inner surface thereof;

a slidable gear having a radially inner surface and a radially outer surface with a plurality of threads formed thereon, the slidable gear drivingly connected to the power source, wherein the threads of the stationary axle housing mate with the threads of the slidable gear;

a first side gear having two axial ends and a radially outer surface, the first side gear drivingly connected to a first axle half shaft, wherein a surface of one of the axial ends of the first side gear has a plurality of teeth formed thereon;

a second side gear having a plurality of teeth formed on one end thereof, the second side gear drivingly connected to a second axle half shaft, wherein the teeth of the second side gear selectively engage the teeth of the first side gear; and a first bearing having an inner peripheral surface and an outer peripheral surface, wherein the inner peripheral surface of the first bearing abuts the radially outer surface of the first side gear and the outer peripheral surface of the first bearing abuts the radially inner surface of the slidable gear, wherein the first engagement spring is positioned on the radially outer surface of the first side gear, wherein one of the axial ends of the first engagement spring is connected to the first bearing and another one of the axial ends of the first engagement spring is connected to the first side gear, and wherein the slidable gear moves along the threads to load the first engagement spring when a position in a rotational direction of the teeth of the first side gear and a position in a rotational direction of the teeth of the second side gear are not in alignment for meshed engagement thereof.

2. The axle disconnect system of claim 1, wherein the power source is an electric motor.

3. The axle disconnect system of claim 1, wherein the slidable gear has an axially extending portion and a radially extending portion, and wherein the threads are formed on the axially extending portion.

4. The axle disconnect system of claim 1, further comprising a drive gear drivingly connected to the power source and the slidable gear.

5. The axle disconnect system of claim 4, wherein the drive gear and slidable gear have a gear ratio greater than 1.

6. The axle disconnect system of claim 1, wherein the first side gear has an axially extending portion and a radially extending portion, and wherein one of the axial ends of the first engagement spring connects to the radially extending portion of the first side gear.

7. The axle disconnect system of claim 6, wherein the first bearing is connected to the axially extending portion of the first side gear.

8. The axle disconnect system of claim 1, wherein the first bearing comprises an outer raceway and an inner raceway, and wherein the outer raceway is connected to the slidable gear and the inner raceway is connected to the first side gear.

9. The axle disconnect system of claim 1, wherein the power source is positioned outside the stationary axle housing.

10. The axle disconnect system of claim 1, further comprising a second bearing having an outer raceway and an inner raceway, wherein the second side gear is connected to the inner raceway of the second bearing and the stationary axle housing is connected to the outer raceway of the second bearing.

11. The axle disconnect system of claim 1, further comprising a second engagement spring positioned on the radially outer surface of the first side gear, the second engagement spring having two axial ends, wherein one of the axial ends of the second engagement spring is connected to the first bearing and another one of the axial ends of the second engagement spring is connected to the first side gear, wherein the second engagement spring is positioned on an axially opposite side of the first bearing as the first engagement spring, and wherein the second engagement spring is compressible to accept a load when the slidable gear is moved during disengagement of the first side gear.

12. The axle disconnect system of claim 11, further comprising a shoulder spacer between the first bearing and the second engagement spring.

13. The axle disconnect system of clam 11, wherein the first side gear has an axially extending portion and a radially extending portion, wherein the another one of the axial ends of the first engagement spring connects to the radially extending portion of the first side gear, and wherein the first engagement spring and the second engagement spring are positioned on the radially outer surface of the axially extending portion of the first side gear.

* * * * *